May 6, 1930.  A. C. RICHARDSON  1,757,218
ANIMAL TRAP
Filed Dec. 7, 1927  3 Sheets-Sheet 1
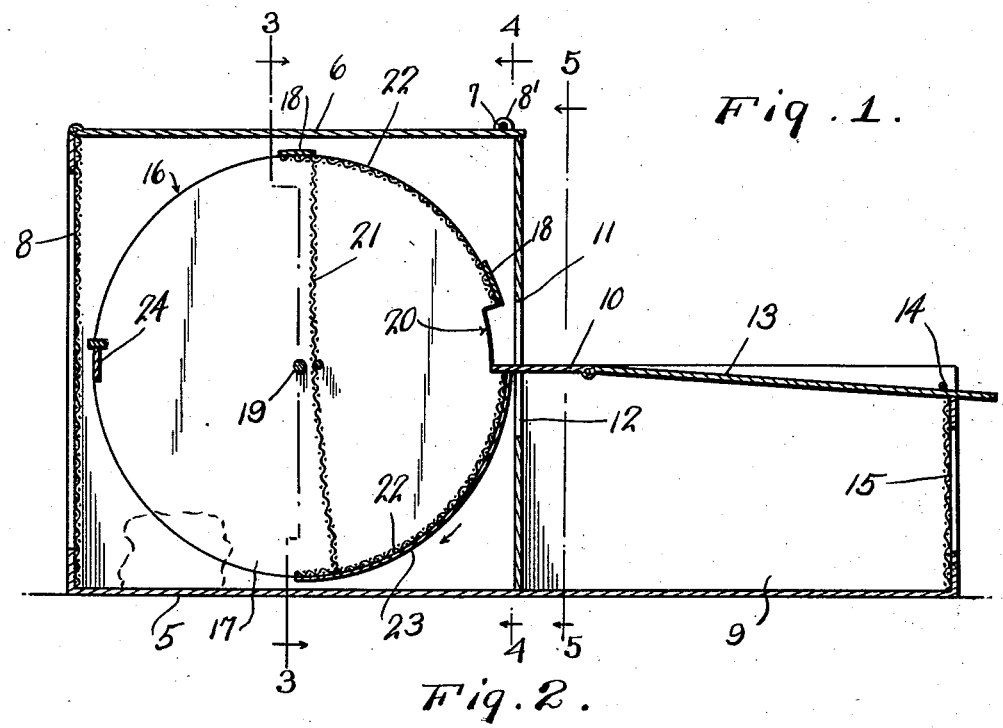
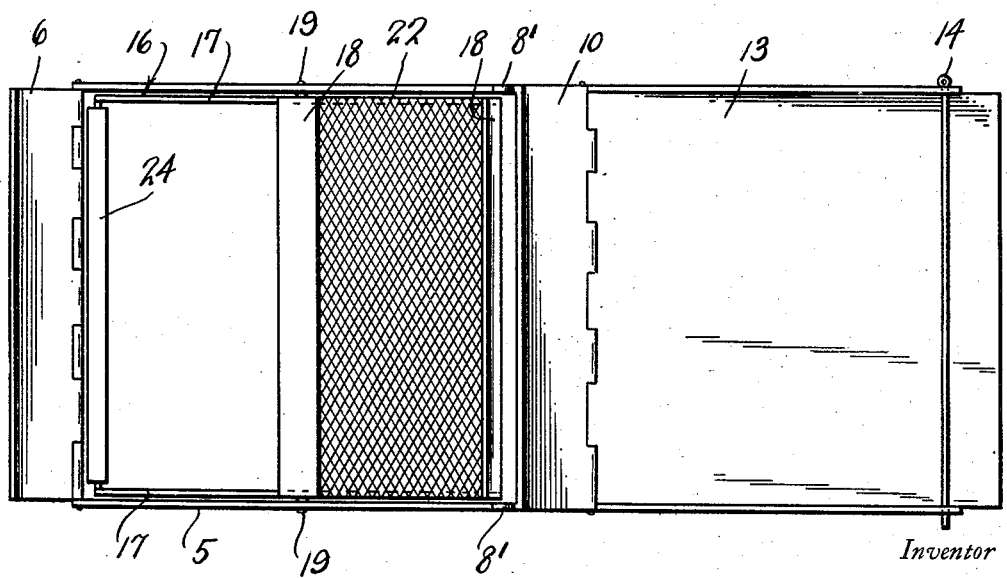
Inventor
Allen C. Richardson
By Clarence A. O'Brien
Attorney May 6, 1930.  A. C. RICHARDSON  1,757,218
ANIMAL TRAP
Filed Dec. 7, 1927    3 Sheets-Sheet 2

Inventor
Allen C. Richardson
By Clarence A. O'Brien
Attorney

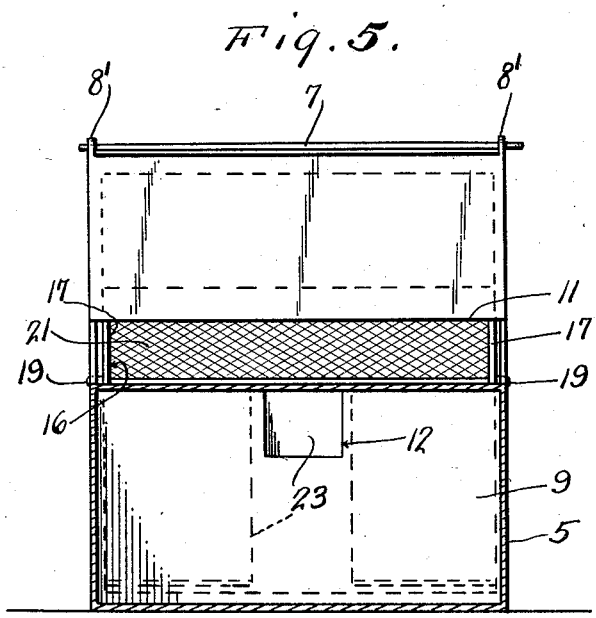
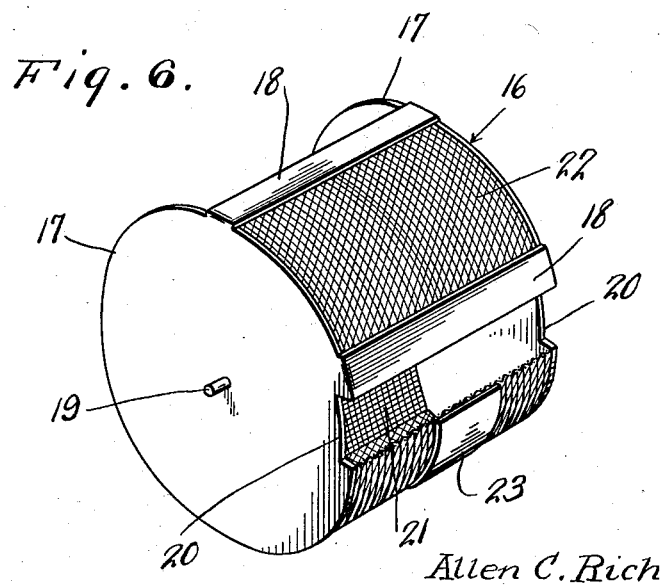

Patented May 6, 1930

1,757,218

UNITED STATES PATENT OFFICE

ALLEN C. RICHARDSON, OF SHELBYVILLE, ILLINOIS, ASSIGNOR OF ONE-HALF TO ELMER PRESNELL, OF PANA, ILLINOIS

ANIMAL TRAP

Application filed December 7, 1927. Serial No. 238,307.

This invention relates to new and useful improvements in animal traps, and aims to provide a simple and inexpensive trap that is primarily though not specifically adapted for use in the trappings of rats and mice. Through the medium of a trap constructed in accordance with this invention there is provided an ever-set mechanism whereby a plurality of rats or mice may be trapped without requiring any setting of the structure, or without necessitating any attention whatever thereto until it is desired to remove the animals therefrom. Furthermore traps of this character will not injure or kill the animals, but positively prevents their escape therefrom when once caught therein. Obviously the animals may be taken from the trap so as to be exterminated by drowning or other humane means.

In the drawings wherein like reference characters indicate corresponding parts throughout the several views:

Figure 1 is a detail longitudinal section through my improved trap.

Figure 2 is a top plan view of the trap, the hinged lid of the cylinder housing being raised.

Figure 3:
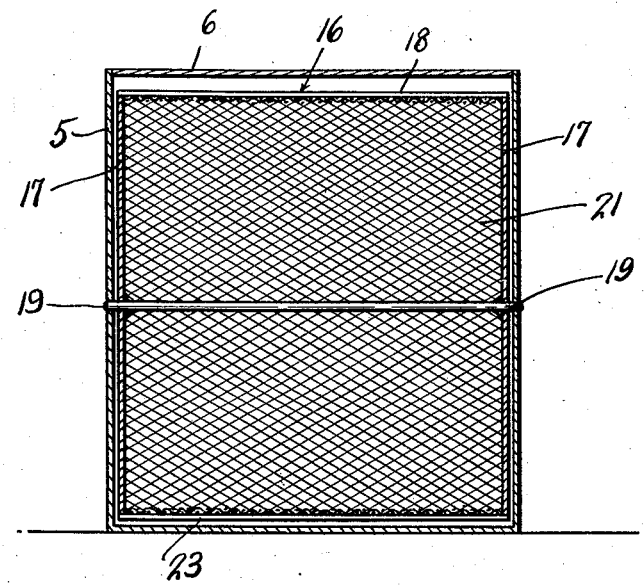
Figure 4:
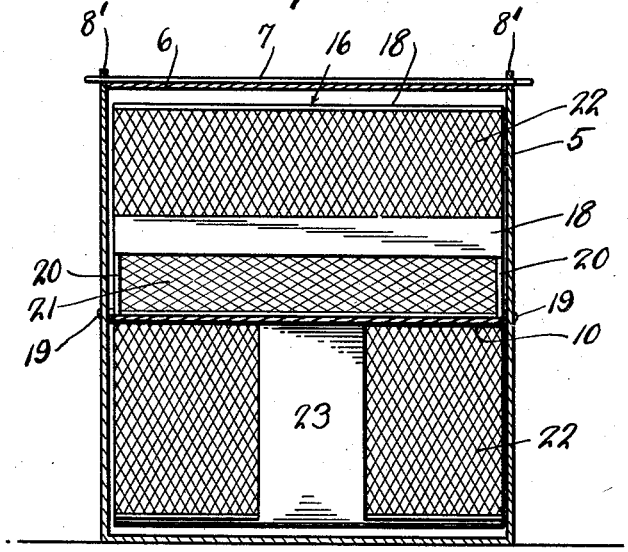

Figures 3, 4 and 5 are detail vertical sections taken respectively upon the lines 3—3, 4—4, and 5—5 of Figure 1, and looking in the direction of the arrows, and Figure 6 is a perspective of a rocking cylindrical unit that forms the most essential feature of the present invention.

Now having particular reference to the drawings, there is disclosed the most preferred embodiment of the invention, the trap consists of a sheet metal housing 5 preferably of square shape as indicated in Figure 1. The upper end of this housing 5 is open and hingedly secured to the upper edge of one of the walls of said housing is a lid 6 that is adapted to rest at its forward edge upon the opposed wall of the housing and to be secured thereto by a relatively elongated cross pin 7 arranged through openings in upstanding ears 8'—8' formed at the upper edges of the side walls of said housing, see Figures 1 and 5. The wall of the housing to which the lid 6 is hinged is preferably formed with an opening within which is arranged wire screening 8 so that the interior of the housing may be viewed.

Formed integrally with the housing 5 at the bottom thereof is a longitudinally extending animal chamber 9 formed at its top with a relatively narrow rigid wall 10, the inner edge of which passes into the housing 5 through a slot 11 that extends throughout the complete length of the adjacent wall of said housing 5, see Figure 5. Beneath this rigid wall 10 of the animal chamber 9, said adjacent wall of the housing 5 is formed centrally with a somewhat narrow cut out 12. Pivoted to the outer edge of this rigid wall 10 of said animal chamber is a lid 13 for the open top side of the chamber which lid normally rests adjacent its free edge upon the upper edge of the outer end wall of the chamber 9 and is secured in such position by a cross pin 14 removably arranged within registering openings in the side walls of the chamber 9 as indicated in Figures 1 and 2. The extreme front wall of this animal chamber 9 is provided with an opening in back of which is a strip of screening 15 so that the interior of this chamber may be readily viewed so as to ascertain if any animal has passed therein.

Arranged for rocking motion within the housing 5 is a cylindrical unit designated generally by the reference character 16 in Figure 6. This cylindrical unit consists of a pair of circular end plates 17—17 that are interconnected at predetermined points by cross strips 18. Arranged longitudinally through the center of this cylindrical unit is a supporting shaft 19, the ends of which project through said end plates and are mounted for rotation within openings in the side walls of the housing 5. The peripheries of the end plates 17—17 of the cylindrical unit 16 are formed with registering notches 20—20 of a predetermined length into which project the inner edge of the rigid top wall 10 of the animal chamber 9 for limiting the rotation of the cylindrical unit in reverse directions within this housing 5. Arranged longitudinally within substantially the center of the cylindrical unit is a strip of wire screening 21, while arranged around the cylindrical unit at the side thereof adjacent the animal chamber 9 are strips of screening 22, the adjacent ends of which terminate at the ends of the slots 20—20 in the end plates 17—17 of the cylindrical unit so as to permit the animals to pass into the chamber formed within the cylindrical unit by reason of said strips of screening 21 and 22—22. For bracing the lowermost strip of screening 22 upon which the animal will fall there is circumferentially arranged between the end plates 17—17 of the cylindrical unit a strip of sheet metal 23. For normally maintaining the opening provided at the surface of the cylindrical unit in registration with the slot 11 of the front wall of the housing 5 there is arranged longitudinally between the end plates 17—17 in opposed relation with the opening formed in the cylindrical unit a weight bar 24. However, this weight is such that when an animal passes into the chamber of the cylindrical unit the weight of the animal will counterbalance the effect of the weight 24 for causing the movement of the cylindrical unit in the direction of the arrow in Figure 1 for thus closing the opening in the cylindrical unit to the opening 11 in the housing 5 to obviously prevent the animals from gaining their freedom from the unit. However, the animal is free to pass through the slot 12 in the inner wall of the animal chamber 9 and after so doing the cylindrical unit is returned to its initial position as indicated in Figure 1.

Within the housing 5 in back of the chamber provided in the cylindrical unit there should be placed a suitable bait as suggested by the dotted line in Figure 1, which bait will be visible to the animals through the opening 11 in the wall of the housing and through the cylindrical unit 16.

In view of the foregoing description when considered in conjunction with the accompanying drawings it is believed that the operation and advantage of a device of this character will be readily appreciated, and even though I have herein shown and described the invention as consisting of certain detailed structural elements it is nevertheless to be understood that some changes may be made therein without affecting the spirit and scope of the appended claims.

Having thus described the invention, what I claim as new and desire to secure by Letters Patent is:—

1. An animal trap including a movable drum having an entrance opening therein, a compartment provided with an entrance opening with which the opening of the drum is registerable, a projection on said compartment for normal engagement within said entrance opening of the drum, to limit the movement of said drum.

2. An animal trap including a movable drum having an entrance opening therein, a compartment provided with an entrance opening with which the opening of the drum is registerable, said compartment being provided with a sectional top, one section of said top being adapted to project beyond one side of the compartment for disposition within the entrance opening of the drum to limit the movement of said drum, the other section of the top being hingedly connected to said first mentioned section.

3. An animal trap including a movable drum having an entrance opening therein, a compartment provided with an entrance opening with which the opening of the drum is registerable, said compartment being provided with a sectional top, one section of said top being adapted to project beyond one side of the compartment for disposition within the entrance opening of the drum to limit the movement of said drum, the other section of the top being hingedly connected to said first mentioned section, one side wall of the compartment parallel to the hinged connection of the last mentioned section terminating below the remaining side walls of said compartment for supporting the free end portion of said hinged section, and a pin transversely disposed over the free end portion of the hinged section and being removably engaged through openings in the opposed side walls of the compartment.

In testimony whereof I affix my signature.

ALLEN C. RICHARDSON.